(12) United States Patent
Defrain et al.

(10) Patent No.: US 11,214,676 B2
(45) Date of Patent: Jan. 4, 2022

(54) POLYENES FOR CURABLE LIQUID RUBBER-BASED COMPOSITIONS

(71) Applicant: Fina Technology, Inc., Houston, TX (US)

(72) Inventors: Olivier Defrain, Gavisse (FR); Tomáš Trnka, Kladno (CZ); Philippe Lodefier, Petit-Ebersviller (FR)

(73) Assignee: Fina Technology, Inc., Houston, TX (US)

( * ) Notice: Subject to any disclaimer, the term of this patent is extended or adjusted under 35 U.S.C. 154(b) by 329 days.

(21) Appl. No.: 16/376,375

(22) Filed: Apr. 5, 2019

(65) Prior Publication Data

US 2020/0317904 A1    Oct. 8, 2020

(51) Int. Cl.
| | | |
|---|---|---|
| C08L 47/00 | (2006.01) | |
| C08F 136/06 | (2006.01) | |
| C08F 136/22 | (2006.01) | |
| C08F 212/08 | (2006.01) | |
| C08F 236/06 | (2006.01) | |
| C08K 3/22 | (2006.01) | |
| C08K 5/098 | (2006.01) | |
| C08K 13/02 | (2006.01) | |
| C09J 125/10 | (2006.01) | |
| C09J 147/00 | (2006.01) | |
| C09K 3/10 | (2006.01) | |
| G10K 11/162 | (2006.01) | |

(52) U.S. Cl.
CPC ............ *C08L 47/00* (2013.01); *C08F 136/06* (2013.01); *C08F 136/22* (2013.01); *C08F 212/08* (2013.01); *C08F 236/06* (2013.01); *C08K 3/22* (2013.01); *C08K 5/098* (2013.01); *C08K 13/02* (2013.01); *C09J 125/10* (2013.01); *C09J 147/00* (2013.01); *C09K 3/10* (2013.01); *G10K 11/162* (2013.01); *C08F 2800/10* (2013.01); *C08F 2810/20* (2013.01); *C08K 2003/2296* (2013.01); *C08L 2207/324* (2013.01); *C08L 2312/00* (2013.01); *C09K 2200/0607* (2013.01)

(58) Field of Classification Search
CPC ..... C08L 9/00; C08L 2312/00; C08L 2312/02
See application file for complete search history.

(56) References Cited

U.S. PATENT DOCUMENTS

| | | | |
|---|---|---|---|
| 4,349,061 A * | 9/1982 | Hirakawa | ............... B60C 15/06 152/209.5 |
| 4,600,745 A | 7/1986 | Creighton | |
| 5,994,422 A | 11/1999 | Born et al. | |
| 6,204,321 B1 | 3/2001 | Lanoye | |
| 6,361,643 B2 | 3/2002 | Born et al. | |
| 8,137,500 B2 | 3/2012 | Sauer et al. | |
| 9,493,687 B2 | 11/2016 | Sauer et al. | |
| 10,308,791 B2 | 6/2019 | Ohkubo et al. | |
| 2001/0044503 A1 | 11/2001 | Born et al. | |
| 2012/0136129 A1* | 5/2012 | Kohlstrung | .......... C08K 5/0025 526/220 |
| 2017/0267842 A1* | 9/2017 | Ohkubo | ................. G10K 11/16 |
| 2017/0299779 A1* | 10/2017 | Mita | ..................... C09J 129/04 |
| 2020/0317904 A1* | 10/2020 | Detrain | ................. C08F 212/08 |

FOREIGN PATENT DOCUMENTS

| | | |
|---|---|---|
| EP | 3231839 A1 | 10/2017 |
| JP | 5847032 A | 3/1983 |
| JP | 2015105278 A | 6/2015 |
| WO | 2016093339 A1 | 6/2016 |

OTHER PUBLICATIONS

International Search Report and Written Opinion for International Application No. PCT/US2020/026652, dated Aug. 4, 2020, 11 pages.
Khoee et al., "Microstructure Analysis of Brominated Styrene-Butadiene Rubber", Polymer Engineering and Science, 2007—pp. 87-94.
Sadeghi et al., "Determination of Microstructure of Polybutadiene-ol Back-bone by FTIR and NMR Spectroscopy", Iranian Polymer Journal, 12(6) 2003—pp. 515-521.
Yoo et al., "The Synthesis and Characterization of Farnesene-based Polymers", presented at the Fall 190th Technical Meeting of Rubber Division, ACS, Cleveland, Ohio, Oct. 11-13, 2016—32 pages.
International Preliminary Report on Patentability and Written Opinion for International Application No. PCT/US2020/026652, dated Sep. 28, 2021, 6 pages.

\* cited by examiner

*Primary Examiner* — Mark S Kaucher
(74) *Attorney, Agent, or Firm* — Albert Shung

(57) ABSTRACT

A curable liquid rubber composition including at least one liquid polyene component and at least one heat activated crosslinking agent. The liquid polyene component may be a single polyene or a blend of polyenes. In one embodiment, the liquid polyene component may contain on a molar basis, at least one monomer that results in at least 45 molar percent of C2-C13 pendant groups. In another embodiment, the liquid polyene component may contain on a molar basis at least one monomer that results in at least 20 molar percent of C2-C5 pendant groups, and at least one monomer that results in at least 7 molar percent of C6-C13 pendant groups. After curing, the liquid rubber composition may have a loss factor greater than 0.51, a maximum loss factor temperature greater than −10° C., and a swelling ratio in toluene from 40% to 170% by weight.

27 Claims, No Drawings

POLYENES FOR CURABLE LIQUID RUBBER-BASED COMPOSITIONS

FIELD OF THE INVENTION

Aspects of the invention are directed to curable liquid rubber compositions and, particularly, to curable liquid rubber compositions that comprise a liquid polyene component that is a liquid polyene or a blend of liquid polyenes wherein the liquid polyene component may comprise on a molar basis at least 45 molar percent of C2-C13 aliphatic or aromatic pendant groups along the backbone of the polyene or blend of polyenes. Alternatively, the liquid polyene component may comprise on a molar basis at least 20 molar percent of C2-C5 aliphatic pendant groups and at least 7 molar percent of C6-C13 aliphatic or aromatic pendant groups along the backbone of the polyene or blend of polyenes.

BACKGROUND OF THE INVENTION

Liquid rubber compositions are commonly used as adhesives, sealants, and/or sound or vibration dampening materials. Such compositions are referred to as "liquid rubber compositions" because they contain one or more polymers which are liquid at room temperature (25° C.) but which are capable of being cured by crosslinking reactions to provide solid elastomeric compositions. Generally, there is a need to balance the damping characteristics and hardness after curing and often the solution is to incorporate solid rubber to impart hardness into relatively lower molecular weight liquid rubbers. However, these lower molecular weight liquid rubbers can suffer from slower crosslinking speed and, concurrently, the addition of solid rubber unacceptably increases the viscosity of the curable rubber composition at room temperature if even slightly higher molecular weight liquid rubbers are used.

The hardness of crosslinked materials can be measured according to a standard protocol (ASTM D2240-15) given as Shore A hardness value at room temperature. This measurement is employed to compare the hardness of several formulations at one temperature. However, the hardness does not provide insight into the crosslink density of various compositions and therefore the hardness value alone is not sufficient to compare compositions based on different liquid rubbers or/and solid rubbers. This is because crosslink density also affects the damping characteristics, usually measured as loss factor value (tan δ).

Manufacturers of damping materials based on liquid polyenes with Mn less than 3000 g/mol blend them with solid rubber(s) to optimize some critical properties of their formulations, such as loss factor and hardness. Due to the incorporation of a solid rubber, the viscosity of formulations at room temperature increases significantly and the temperature of the formulations are also increased in order to apply them.

Accordingly, improved liquid rubber compositions that are liquid at ambient temperature and yet retain excellent damping properties are greatly desired.

SUMMARY OF THE INVENTION

Aspects of the invention are directed to curable liquid rubber compositions that comprise a liquid polyene component. The liquid polyene component may be a liquid polyene having a polyene backbone or a blend of liquid polyenes each having a polyene backbone. In particular, the liquid polyene component, on a molar basis, may have at least 45 molar percent of C2-C13 pendant groups along the polyene backbone. Alternatively or in addition, the liquid polyene component may have, on a molar basis, at least 20 molar percent of C2-C5 pendant groups and at least 7 molar percent of C6-C13 pendant groups along the polyene backbone or backbones. The curable composition also comprises at least one heat activated crosslinking agent. After curing, the cured rubber composition has the following properties:

a loss factor (tan δ) greater than 0.51 when measured at 50 Hz frequency, 3 μm amplitude, and temperatures of −10° C. to 45° C.;

a maximum loss factor temperature greater than −10° C.; and a swelling ratio from 40% to 170% by weight, as measured by equilibrium weight gain in toluene at 25° C.

Further, in addition to the high amount of pendant groups, the liquid polyene component may have a weight average molecular weight of 2000 g/mol or higher. The polyene component may have a weight average molecular weight higher than 2500 g/mol. The curable liquid rubber compositions may comprise between 0% and 1% by weight of solid rubber or solid thermoplastic.

The high content of pendant groups and a weight average molecular weight higher than 2000 g/mol for the polyene component enable the cured compositions disclosed herein to have a higher maximum loss factor (tan δ) compared to cured rubbers obtained from liquid rubber-based formulations that do not contain polyenes possessing these attributes. The improved damping is seen in a temperature range from −10° C. to +45° C., as described in the Examples for systems that are cured either with sulfur-based systems or with organic peroxides. This improvement of damping performance is achieved for a swelling ratio range from 40% to 170% without detrimentally impacting the hardness of the cured formulations.

The invention is also directed to cured rubber compositions that are produced by heating a curable liquid rubber composition to between 100° C. and 240° C. and maintaining the temperature for at least 5 minutes and up to and including 10 hours. The curable liquid rubber composition that is heated to produce the cured rubber composition comprises a liquid polyene component. The liquid polyene component can be a liquid polyene comprising a polyene backbone or a blend of liquid polyenes each comprising a polyene backbone. The liquid polyene component may comprise, on a total molar basis, as polymerized units, at least one monomer that results in at least 45 molar percent of C2-C13 pendant groups along the polyene backbone. The liquid polyene may also, or alternatively, comprise on a total molar basis, as polymerized units, at least one monomer that results in at least 20 molar percent of C2-C5 pendant groups along the backbone of the polyene, and at least one monomer that results in at least 7 molar percent of C6-C13 pendant groups along the backbone of the polyene. The curable liquid rubber composition that is heated to produce the cured rubber composition also includes at least one heat activated crosslinking agent.

The properties of the cured rubber composition are: a loss factor (tan δ) greater than 0.51 when measured at 50 Hz frequency, 3 μm amplitude, and temperatures of −10° C. to 45° C.; a maximum loss factor temperature greater than −10° C.; and a swelling ratio from 40% to 170% by weight, as measured by equilibrium weight gain in toluene at 25° C. Due to their specific microstructures and macrostructures, it is possible to increase the amount of the specific liquid polyene component and to reduce the content of high Mw polymers in the formulations. Therefore, vibration, noise and harshness mitigating materials containing the liquid polyene component described herein result in compositions possessing lower viscosity, which are more easily applied to substrates at ambient conditions.

DETAILED DESCRIPTION OF THE INVENTION

Aspects of the invention are directed to liquid rubber compositions having a liquid polyene component that are curable with peroxide systems or with sulfur. The liquid polyene component is a liquid polyene or a blend of liquid polyenes. The curable liquid rubber compositions may be well suited for use as adhesives, sealants, and/or vibration or acoustic dampening applications. By employing aspects of the invention, a curable rubber composition may be obtained that is liquid at ambient temperature (e.g., 20° C. to 40° C.) and yet when cured has a loss factor (tan δ) greater than 0.51 when measured at 50 Hz frequency, 3 μm amplitude, and temperatures of −10° C. to 45° C.; a maximum loss factor temperature greater than −10° C.; and a swelling ratio from 40% to 170% by weight, as measured by equilibrium weight gain in toluene at 25° C. For instance, a liquid rubber polyene composition wherein the liquid polyene component has a weight average molecular weight greater than 4000 g/mol as disclosed herein may, after cure, have a swelling ratio in toluene at 25° C. between 150%-155% and a Shore A hardness value of 60.

The curable rubber compositions as disclosed herein may comprise between 10 and 80 weight percent of the disclosed liquid polyene component. The disclosed curable rubber compositions may comprise between 15 and 55 weight percent of the liquid polyene component disclosed herein. Other suitable ranges are between 20 and 50 weight percent of the liquid polyene component disclosed herein.

Liquid Polyene Component:

The term, "liquid" as used herein means that prior to cure, the polyenes or blend of polyenes that comprise the liquid polyene component can be pumped or poured at a temperature below 100° C. without any additional additives.

The term "liquid polyene component" as used herein means either a single liquid polyene or a blend of liquid polyenes. Therefore, properties of the liquid polyene component refer to the single polyene, if only one polyene is used. If a blend of liquid polyenes is used, the properties refer to the blend as a whole. For instance, weight average molecular weight refers to the entire blend, not just a single polyene in the blend. Likewise, the molar percentage of monomers that comprise the liquid polyenes in the blend refers to the blend as whole, not each individual liquid polyene in the blend.

Monomers:

The structure of the liquid polyene component is important to the performance and physical properties of the curable liquid rubber composition as disclosed herein, both before and after crosslinking, or curing. As Mentioned above, the liquid polyene polymer component may be a single liquid polyene or a blend of liquid polyene polymers. Before cure, it is desirable that the liquid polyene polymer component has a weight average molecular weight as a whole greater than 2000 g/mol and a minimum molar amount of pendant groups. This minimum molar amount of pendant groups is described in detail below.

The polymer or the polymers comprising the polyene component have a polyene backbone, meaning that the backbone of the polymer chain comprises, in at least portions of the polymer backbone, multiple carbon-carbon double bonds. Along this backbone are pendant groups (i.e., groups other than hydrogen atoms which are pendant to the polymer backbone), which can comprise aliphatic groups, aromatic groups, or mixtures thereof. The polyene or the blend of polyenes as a whole must comprise either at least 45 molar percent of C2-C13 pendant groups along the polyene backbone(s) or alternatively at least 20 molar percent of C2-C5 pendant groups and at least 7 molar percent of C6-C13 pendant groups along the polyene backbone(s). In practice, this means that the polyene or the polyenes in the blend of polyenes comprise, as polymerized units, monomers or comonomers that will result in the recited molar amounts of the recited pendant groups either in the single polyene or in the blend of such polyenes as a whole. In addition, the polyene or polyenes can optionally be terminated with hydroxyl groups or functional derivatives thereof such as are known in the art. Non-limiting examples of such functional groups include, in addition to the —OH group: esters, carboxylic acids, epoxides, amides, amines, anhydrides, acrylates, methacrylates, and silanes.

For avoidance of doubt, the molar percent of pendant groups in the liquid polyene component does not necessarily correspond to the molar percent of the monomers that are polymerized together to form the polyene(s). As is well known in the art, particularly for the case of diene monomers such as butadiene, if both double bonds, rather than just one of the double bonds in a diene molecule are incorporated into the polyene backbone, there will not be a pendant group resulting from that diene molecule. For this reason, as detailed herein, it is important to utilize analytical techniques (e.g., NMR) to measure the amount of pendant groups in the polyene, particularly for polyenes incorporating butadiene as a monomer or comonomer. A further explanation of how the molar % of pendant groups in the liquid polyene component may be determined appears in the Examples section below.

Monomers that when homopolymerized may result in C2-C13 pendant groups and are present in the polyene(s) as polymerized units at a level sufficient to result in at least 45 molar percent of C2-C13 pendant groups along the liquid polyene component backbone(s):

Examples of such monomers or comonomers include but are not limited to: C4-C15 dienes, C6-C15 trienes, C8-C15 tetraenes, vinyl aromatic compounds comprising 15 or fewer carbon atoms (i.e., vinyl aromatic compounds comprising 8 to 15 carbon atoms), and mixtures thereof. Particular non-limiting examples of suitable vinyl aromatic-containing monomers that may be used in the practice of the invention are: styrene, alpha-methyl styrene, 2-methylstyrene, 3-methylstyrene, 4-methylstyrene, 4-propyl styrene, 4-t-butylstyrene, 4-cyclohexyl styrene, 2,4-dimethylstyrene, 2,4-diisopropyl styrene, 2,4,6-trimethyl styrene, 1-vinylnaphthalene, 2-vinyl naphthalene, N, N-diethyl-4-aminoethyl styrene, vinyl pyridine, 4-methoxystyrene, monochloro styrene, dichloro styrene, divinyl benzene, and mixtures thereof. Suitable non-limiting examples of C4 to C15 dienes that may (depending upon how they are polymerized) result in C2 to C13 pendant groups along the backbone of the polymer include: butadiene; isoprene; 2,3-dimethyl butadiene; 2-phenyl butadiene; 1,3-pentadiene; 2-methyl-1,3-pentadiene; 1,3-hexadiene; 1,3-octadiene; 1,3-cyclohexadiene; 2-methyl-1,3-octadiene; bergamotene; limonene; and mixtures thereof. Non-limiting examples of C6 to C15 trienes are 1,3,7-octatriene; zingiberene; bisabolene; sesquiphellandrene; ocimene; myrcene; and mixtures thereof. A non-limiting example of a suitable C8-C15 tetraene is farnesene.

The monomers as listed above may be present in polymerized form in the liquid polyene component in an amount that results in at least 45 molar percent of C2-C13 pendant groups along the backbone of the polymer. Also suitable are at least 50, at least 55, at least 60, at least 65, at least 70, at least 75, at least 80, at least 85, at least 90, at least 95 or up to 100 molar percent of C2-C13 pendant groups along the polyene component backbone(s).

Monomers that when homopolymerized may result in C2-C5 pendant groups and are present in the polyene as polymerized units at a level sufficient to result in at least 20 molar percent of C2-C5 pendant groups along the polyene component backbone(s):

Examples of such monomers or comonomers include but are not limited to: C4-C7 dienes and mixtures thereof. Non-limiting specific examples include: butadiene; isoprene; 2,3-dimethyl butadiene; 1,3-pentadiene; 2-methyl-1,3-pentadiene; 1,3-hexadiene; 1,3-cyclohexadiene; and mixtures thereof. These monomers may be present in polymerized form in the liquid polyene in an amount that results in at least 20 molar percent of C2-C5 pendant groups along the backbone of the polymer. Also suitable are at least 25, at least 30, at least 35, at least 40, at least 45, at least 50, at least 55, at least 60, at least 65, at least 70, at least 75, at least 80, at least 85, at least 90, or up to 93 molar percent of C2-C5 pendant groups along the backbone of the polyene(s).

Monomers that when homopolymerized may result in C6-C13 pendant groups and are present in the polyene as polymerized units at a level sufficient to result in at least 7 molar percent of C6-C13 pendant groups along the liquid polyene component backbone(s):

Examples of such monomers or comonomers include but are not limited to: C8-C15 dienes, trienes and tetraenes, vinyl aromatic monomers comprising between 8 and 15 carbon atoms, and mixtures thereof. Non-limiting specific examples of such monomers or comonomers include: myrcene; styrene; alpha-methyl styrene; 2-methylstyrene; 3-methylstyrene; 4-methylstyrene; 4-propyl styrene; 4-t-butylstyrene; 4-cyclohexyl styrene; 2,4-dimethylstyrene; 2,4-diisopropyl styrene; 2,4,6-trimethyl styrene; 1-vinylnaphthalene; 2-vinyl naphthalene; N,N-diethyl-4-aminoethyl styrene; vinyl pyridine; 4-methoxystyrene; monochloro styrene; dichloro styrene; divinyl benzene; farnesene, 1,3,7-octatriene; 1,3-octadiene; 2-methyl-1,3-octadiene; bergamotene; limonene; zingiberene; bisabolene; sesquiphellandrene; ocimene; farnesene; and mixtures thereof. These monomers may be present in polymerized form in the liquid polyene component in an amount that results in at least 7 molar percent of C6-C13 pendant groups along the polyene component backbone(s). Also suitable are at least 10, at least 15, at least 20, at least 25, at least 30, at least 35, at least 40; at least 45, at least 50, at least 55, at least 60, at least 65, at least 70, at least 75, or up to 80 molar percent of C6-C13 pendant groups along the polyene component backbone(s).

Weight (Mass) Average Molecular Weight:

The weight average molecular weight (Mw) of the liquid polyenes described herein may be a weight average molecular weight greater than 2000 g/mol. The polyenes may have a Mw greater than 2100 g/mol, greater than 2200 g/mol, greater than 2300 g/mol, greater than 2400 g/mol, greater than 2500 g/mol, greater than 2600 g/mol, greater than 2700 g/mol, greater than 2800 g/mol, greater than 2900 g/mol, greater than 3000 g/mol, greater than 3250 g/mol, greater than 3500 g/mol, greater than 3750 g/mol, greater than 4000 g/mol, greater than 4250 g/mol, greater than 4500 g/mol, greater than 4750 g/mol, greater than 5000 g/mol, greater than 5250 g/mol, greater than 5500 g/mol, greater than 5750 g/mol, greater than 6000 g/mol, greater than 7000 g/mol, greater than 8000 g/mol, greater than 9000 g/mol, greater than 10,000 g/mol, greater than 12,000 g/mol, greater than 14,000 g/mol, greater than 16,000 g/mol, greater than 18,000 g/mol, greater than 20,000 g/mol, greater than 22,500 g/mol, or 25,000 g/mol. Weight average molecular weight may be measured by the method described in the Examples section which follows. In addition, as mentioned above, weight average molecular weight refers to the liquid polyene component as a whole, i.e. if the liquid polyene component is a blend of liquid polyenes, the weight average molecular weight refers to the weight average molecular weight of the entire blend.

Loss Factor (Tan δ):

The loss factor, tan δ, is measured using dynamic mechanical analysis (DMA), usually over a temperature range. Tan δ is a measure of a material's ability to dissipate energy, and therefore a higher tan δ value is associated with a higher damping performance. The tan δ value changes depending on the temperature and so the temperature at which the maximum tan δ is measured is reported as the maximum loss factor temperature. The tan δ is measured at 50 Hz frequency, 3 μm amplitude, and over a range of temperatures from −10° C. to 45° C.

After cure (crosslinking) the heat curable liquid rubber composition disclosed herein may have a tan δ of 0.51 or higher. The maximum tan δ may be higher than 0.525, higher than 0.550, higher than 0.575, higher than 0.600, higher than 0.625, higher than 0.650, higher than 0.675, higher than 0.700, higher than 0.725, higher than 0.750, or higher than 0.775. After cure, the heat curable liquid rubber composition disclosed herein may have a maximum loss factor temperature greater than −10° C., greater than −5° C., greater than 0° C., greater than 5° C., greater than 10° C., greater than 15° C., greater than 20° C., greater than 25° C., greater than 30° C., greater than 35° C., or greater than 40° C.

Shore A Hardness:

Shore A hardness as described herein is measured according to ASTM D2240-15. The cured heat curable liquid rubber polyene composition may have a Shore A hardness greater than 30, greater than 35, greater than 40, greater than 45, greater than 50, greater than 55, greater than 60, greater than 65, greater than 66, greater than 67, greater than 68, greater than 69, greater than 70, greater than 71, greater than 72, greater than 73, greater than 74, or greater than 75. The Shore A hardness of the cured heat curable liquid rubber polyene compositions as disclosed herein may be from 30 to 90, from 40 to 85, and alternatively from 60 to 80.

Swelling Ratio:

The swelling ratio is related to crosslink density of a cured rubber composition and is measured by determining how much solvent a crosslinked (cured) sample of the heat curable liquid rubber composition absorbs at a fixed temperature. In general, lower swelling ratios are associated with a greater crosslink density. As described herein, the crosslink density is reported as the equilibrium percent weight gain in toluene at 25° C. The swelling ratio of the crosslinked liquid rubber composition may be from 40% to 150% by weight, from 40% to 125% by weight, from 50% to 110% by weight, or from 60% to 100% by weight. The swelling ratio is measured according to the procedure described in the Examples.

Viscosity:

The viscosity as described herein is the viscosity of the liquid polyene component alone. For avoidance of doubt, it is not the viscosity of the heat curable composition liquid rubber composition comprising the liquid polyene component. The viscosity herein is reported as the Brookfield viscosity, measured using the S spindle at 25° C. The viscosity of the liquid rubber polyene may be from 500 to 700,000 mPa·sec at 25° C. Where a mixture of different liquid rubber polyenes is used as the liquid polyene component, the viscosity of the mixture may be measured.

Solid Rubber or Thermoplastic:

The heat curable liquid rubber composition may comprise less than 1 percent, i.e., from 0% to 1%, by weight of solid rubber or thermoplastic. Solid rubbers are defined as rubbers that cannot be pumped or poured at temperatures less than 100° C. without additives and have a weight average molecular weight greater than 100,000 g/mol before cure.

Heat Activated Crosslinking Agents:

The terms "crosslink" and "cure" as used herein are interchangeable and are understood to mean that chemical bonds have been formed between adjacent chains of the individual polyene molecules. Examples of suitable crosslinking or curing agents that can be used in the curable liquid rubber compositions are sulfur and peroxides. Either of these types of crosslinking agents may be used at appropriate levels with appropriate coagents, accelerators or activators such as are known and used in the art to increase the speed and completeness of crosslinking. The curing agent can be selected based on the desired curing temperature of the liquid rubber polyene composition. Typically, the curing temperature is between 100° C. and 190° C.

As used herein, the term "phr" means parts by weight per 100 parts by weight resin or liquid rubber, wherein the resin is the liquid polyene component, i.e. the liquid polyene or combination of liquid polyenes in the curable liquid rubber composition.

Organic Peroxides:

Organic peroxides can be used to cure the polyenes of the present invention. Suitable organic peroxides include those organic peroxides commonly used in the art to crosslink polymers, including rubbers. Suitable peroxides include but are not limited to: dicumyl peroxide; aryl or diaryl peroxides; diacetyl peroxide; benzoyl peroxide; dibenzoyl peroxide; di-tert-butyl peroxide; tert-butyl-cumylperoxide; 2,5-bis (tert-butylperoxy)-2,5-dimethylhexane; cumyl peroxide; 2,5-dimethyl-2,5-di-(tert-butylperoxy) hexyne-3; p-bis[2-(2-t-butylperoxy)propyl]benzene; 2,5-dimethyl-2,5-di-tert-butylperoxyhexane; tert-butyl peroxide; tert-butylperbenzoate; tert-butyl perpxyisopropylate, di-(2-ter-butylperoxy-isopropyl)benzene; butyl 4,4-di-(tert-butylperoxy) valerate; 1,1-di(tert-butylperoxy)-3,3,5-trimethylcyclohexane; and mixtures thereof.

Non-limiting examples of other suitable peroxides are: peroxyketals (such as 1,1'-di(tert-butylperoxy)-3,3,5-trimethylcyclohexane or di(tert-butylperoxy)-cyclohexane); diacyl peroxides (such as dibenzoyl peroxide or dilauroyl peroxide) and peroxyesters (such as tert-butyl peroxyisobutyrate or tert-amyl peroxy-2-ethylhexylcarbonate). In another embodiment, the peroxide may be selected from the group consisting of peroxyketals (such as 1,1'-di(tert-butylperoxy)-3,3,5-trimethylcyclohexane or di(tert-butylperoxy)-cyclohexane); diacyl peroxides (such as dibenzoyl peroxide) and peroxyesters.

The curable liquid rubber composition may include, as heat-activated crosslinking agents, two or more organic peroxides. For example, the curable liquid rubber composition may comprise at least two peroxides selected from the group consisting of peroxyketals (such as 1,1'-di(tert-butylperoxy)-3,3,5-trimethylcyclohexane or di(tert-butylperoxy)-cyclohexane); diacyl peroxides (such as dibenzoyl peroxide or dilauroyl peroxide) and peroxyesters (such as tert-butyl peroxyisobutyrate or tert-amyl peroxy-2-ethylhexylcarbonate). "Half-life" is a convenient means of expressing the rate of decomposition of an organic peroxide at a specified temperature. The time required for one-half of the organic peroxide originally present to decompose at any particular temperature is measured. Organic peroxides having a 10-hour half-life from 47° C. to 127° C. are suitable.

The amount of peroxide present in the curable liquid rubber composition will vary depending upon the type(s) of peroxide used, the reactivities of the polyene(s), the type and reactivity of the accelerator or activator (if present), and the desired curing profile and target cured rubber properties as well as other factors. Typically, however, the curable liquid rubber composition will comprise one or more peroxides) in an amount of from 1 to 30 phr (parts per hundred parts, by weight, of the liquid polyene component), or from 1.5 to 20 phr. It is to be understood that this amount refers to the peroxide(s) only. Appropriate accelerators, coagents or activators may be used in addition to the peroxide. Each of the accelerator or coagent or activator (if present) are typically present in an amount between 0.1 and 30 phr. The accelerator or coagent or activator (if present) may be present between 0.2 and 25 phr or between 0.2 and 20 phr.

Sulfur:

Sulfur can be used as the heat activated crosslinking agent. Typically, sulfur is added in an amount of from 1 to 30 phr, or from 1.5 to 20 phr (parts per hundred parts, by weight, of the liquid polyene component). It is to be understood that this amount refers to sulfur added in elemental form only. Sulfur donors may also be used. Each of the accelerator or coagent or activator (if present) are typically present between 0.1 and 30 phr. The accelerator or coagent or activator (if present) may be present between 0.2 and 25 phr or between 0.2 and 20 phr. Appropriate accelerators, coagents or activators may be used in addition to the sulfur. Each of the accelerator or coagent or activator (if present) are typically present between 0.1 and 30 phr. The accelerator or coagent or activator (if present) may be present between 0.2 and 25 phr or between 0.2 and 20 phr.

Sulfur donors can be also employed with sulfur to reduce the sulfur content incorporated in the formulation. Non-limiting examples of sulfur donors are thiuram tetrasulfides and morpholine derivatives such as tetramethyl thiuram disulfide; 4,4'-dithiodimorpholine; dipentamethylene thiuram tetrasulfide; and thiocarbamyl sulfenamide.

Accelerators:

Examples of accelerators that may be used with sulfur as the primary curing agent include but are not limited to: sulfenamides, thiazoles, dithiocarbamates, a thiuram-based compound of N-cyclohexyl-2-benzothiazolesulfenamide (CBS); N-tert-butyl-2-benzothiazyl sulfenamide (TBBS); zinc dimethyl dithiocarbamate (ZDMC), zinc dibenzyldithiocarbamate (ZBEC); 2-mercaptobenzothiazole (MBT); benzothiazyl disulfide (MBTS). Some primary accelerators, such as thiazole (MBT or MBTS) or dithiocarbamates (ZDMC or ZBEC), can be used in a blend with sulphenamides or instead of sulphenamides. Other non-limiting examples of accelerators are: thiurams such as tetramethyl thiuram disulfide (TMTD) or tetrabenzylthiuram disulfide (TBzTD). Dithiocarbamates as mentioned above or xanthates, for example zinc isopropylxanthate (ZIX) or sodium isopropylxanthate (NaIX) can be also employed.

Activators:

Examples of suitable activators that can be used with organic peroxides or sulfur as the primary crosslinking agent include but are not limited to: metal oxides, fatty acid metal salts (e.g., metal stearates), fatty acids, and mixtures thereof. Non-limiting specific examples include: zinc oxide, calcium oxide, magnesium oxide, zinc stearate, or stearic acid.

Coagents:

The curable liquid rubber compositions may also include at least one coagent that is adapted for crosslinking with organic peroxides and/or sulfur. The coagent may contain one or more sites of ethylenic unsaturation (carbon-carbon double bonds) per molecule and may be selected from the group consisting of acrylates, methacrylates, bismaleimides, vinyl esters, allylic compounds, and derivatives thereof. In preferred embodiments of the invention, the curable liquid polyene composition is comprised of from 0 phr to 30 phr coagent in total. In other embodiments, the liquid rubber composition may be comprised of 0.5 to 15% by weight coagent. Non-limiting examples of suitable coagents include metallic acrylates, metallic methacrylates, metallic acrylate salts, metallic methacrylate salts. Zinc acrylate, zinc methacrylate, zinc acrylate salts, and zinc methacrylate salts may be mentioned in particular.

Sulfur can be also introduced as coagent when crosslinking these liquid polyene based compositions with organic peroxides. The sulfur content when used as a coagent with peroxide should be low, i.e., not more than 0.5% by weight sulfur.

Non-Solid-Rubber, Non-Thermoplastic Fillers:

The curable liquid rubber composition may include at least one filler that is not the aforementioned solid rubber or thermoplastic. In particular, the filler may include at least one inorganic filler. Suitable fillers include any of the fillers known in the art related to curable liquid rubber compositions, including for example calcium carbonate, silicas, carbon black, clays, talc, mica, calcium oxide, aluminas, magnesium carbonate, and the like. The aforementioned fillers may be heat treated or treated with silanes, resins, or cationic species to prevent or reduce decomposition of some peroxides. The curable liquid rubber compositions may comprise between 15 and 70 weight percent of the filler or between 25 and 60 weight percent of the filler.

Other Additives:

Optionally, one or more additional components may be included in the heat curable liquid rubber composition in order to achieve the final properties desired for particular end-use applications (such as adhesive and sealant applications). A non-exhaustive list of such optional additional components is as follows:
  tackifiers and/or coupling agents;
  adhesion promoters, such as functionalized liquid rubber resins (e.g., maleinized liquid polybutadiene resins);
  plasticizers or extender oils, such as paraffinic oil; and/or
  stabilizers against thermal, thermo-oxidative or ozone degradation.

Exemplary Uses:

The heat curable liquid rubber compositions of the present invention are especially useful for the production of materials intended for the reduction of vibration and/or acoustic noise, such as in automotive and other vehicular applications. The curable liquid rubber compositions in the cured state have acoustic damping properties. Any of the known or conventional coating, molding, shaping, forming or impregnation methods known in the art may be employed to produce articles comprised of a cured rubber obtained from the curable liquid rubber compositions of the present invention. For example, the inventive curable liquid rubber compositions may be utilized in the manufacture of acoustic dampening components, belts, hoses, rubber rollers, engineered products, vibration mounts, tires, O-rings, gaskets, wire and cable coatings, expansion joints and the like, including elastomeric products or composite products containing an elastomeric component generally. The use of the curable liquid rubber compositions of the present invention as adhesives, sealants and coatings is also contemplated. In one embodiment, the curable liquid rubber composition is applied to a substrate surface (such as a metal sheet, panel or other such component), using a suitable technique such as spraying, dipping, roller coating or the like, and then heated to a temperature effective to cure the curable liquid rubber composition. Accordingly, the curable liquid rubber composition may be formulated such that it has a viscosity which makes it capable of being applied by pumping and/or spraying. For example, the curable liquid rubber composition may be pumpable and/or sprayable with the aid of automatic application systems, such as robotic systems.

According to a further aspect of the invention, a cured rubber composition is provided. The cured rubber composition may be obtained by curing a curable liquid rubber composition as disclosed herein by heating the curable low sulfur liquid rubber composition. The curable low sulfur liquid rubber composition is, advantageously, curable by heating the curable liquid rubber composition to a temperature of about 100° C. to about 240° C. or a temperature of about 100° C. to about 190° C. To effect curing, the curable composition is held at the temperature for between 5 minutes and 10 hours. As a result of such curing, the curable liquid rubber composition is converted (e.g., by crosslinking reactions) into a solid, elastomeric (rubbery) composition. Typically, curing is achieved by heating the curable liquid rubber composition to a temperature effective to initiate the desired crosslinking reaction involving at least the polymer component. Typically the time period to achieve adequate cure is between 5 minutes and 10 hours.

Curing Conditions:

Typically, curing is achieved by heating the curable liquid rubber composition to a temperature effective to initiate the desired crosslinking reaction. The curing temperature will depend upon the crosslinking system employed, as well as the reactivity of the other components of the curable liquid rubber composition, but generally speaking temperatures within the range of from about 100° C. to about 240° C. are suitable (with temperatures of from about 100° C. to about 190° C. being typically preferred). Heating may be carried out for a time effective to achieve the desired state of cure. Such cure times are variable, depending upon a number of factors, but typically are from about 5 minutes to about 10 hours.

Various Exemplary Aspects of the Invention May be Summarized as Follows:

Aspect 1. A heat curable liquid rubber composition comprising:
  a) a liquid polyene component, wherein the liquid polyene component is a liquid polyene comprising a polyene backbone or a blend of liquid polyenes each comprising a polyene backbone, wherein the liquid polyene component comprises on a total molar basis, as polymerized units,
    i) at least one monomer that results in at least 45 molar percent of C2-C13 pendant groups along the polyene backbone; or
    ii) at least one monomer that results in at least 20 molar percent of C2-C5 pendant groups along the backbone of the polyene, and at least one monomer that results in at least 7 molar percent of C6-C13 pendant groups along the backbone of the polyene; and b) at least one heat activated crosslinking agent; and wherein, after curing, the heat curable liquid rubber composition yields a cured rubber composition comprising:

i) a loss factor (tan δ) greater than 0.51 when measured at 50 Hz frequency, 3 μm amplitude, and temperatures of −10° C. to 45° C.;

ii) a maximum loss factor temperature greater than −10° C.; and iii) a swelling ratio from 40% to 170% by weight, as measured by equilibrium weight gain in toluene at 25° C.

Aspect 2: The heat curable liquid rubber composition according to Aspect 1, wherein the liquid polyene component has a weight average molecular weight greater than 2000 g/mol and a Brookfield S spindle viscosity of 500-700,000 mPa·sec at 25° C.

Aspect 3: The heat curable liquid rubber composition according to either of Aspect 1 or Aspect 2, wherein the heat curable liquid rubber composition comprises between 0% and 1% by weight in total of a solid rubber or a solid thermoplastic.

Aspect 4: The heat curable liquid rubber polyene composition according to any of Aspects 1-3, wherein the liquid polyene or at least one liquid polyene in the blend of liquid polyenes is terminated with hydroxyl groups or functional derivatives thereof.

Aspect 5: The heat curable liquid rubber composition according to any of Aspects 1-4, wherein after curing the cured rubber composition has a Shore A hardness greater than 55 as measured by ASTM Standard D2240-15.

Aspect 6: The heat curable liquid rubber composition according to any of Aspects 1-5, wherein the at least one monomer that results in the C2-C13 pendant group is selected from the group consisting of C4 to C15 dienes, C6 to C15 trienes, C8-C15 tetraenes, vinyl aromatic compounds comprising 15 or fewer carbon atoms, and mixtures thereof.

Aspect 7: The heat curable liquid rubber composition according to any of Aspects 1-6, wherein the at least one monomer that results in the C2-C13 pendant group comprises at least one vinyl aromatic compound selected from the group consisting of styrene; alpha-methyl styrene; 2-methylstyrene; 3-methylstyrene; 4-methylstyrene; 4-propyl styrene; 4-t-butylstyrene; 4-cyclohexyl styrene; 2,4-dimethylstyrene; 2,4-diisopropyl styrene; 2,4,6-trimethyl styrene; 1-vinylnaphthalene; 2-vinyl naphthalene; N, N-diethyl-4-aminoethyl styrene; vinyl pyridine; 4-methoxystyrene; monochldro styrene; dichloro styrene; divinyl benzene; and mixtures thereof.

Aspect 8: The heat curable liquid rubber composition according to any of Aspects 1-7, wherein the at least one monomer that results in the C2-C13 pendant group comprises at least one of: a) a C4 to C14 diene selected from the group consisting of butadiene, isoprene, 2,3-dimethyl butadiene, 2-phenyl butadiene, 1,3-pentadiene, 2-methyl-1,3-pentadiene, 1,3-hexadiene, 1,3-octadiene, 1,3-cyclohexadiene, 2-methyl-1,3-octadiene, and mixtures thereof; b) a C6 to C15 triene selected from the group consisting of 1,3,7-octatriene, myrcene, and mixtures thereof; or c) farnesene.

Aspect 9: The heat curable liquid rubber composition according to any of Aspects 1-8, wherein the at least one monomer that results in the C2-C13 pendant groups is selected from the group consisting of butadiene, isoprene, alpha-methyl styrene, styrene, myrcene, farnesene, and mixtures thereof.

Aspect 10: The heat curable liquid rubber composition according to any of Aspects 1-9, wherein the at least one monomer that results in the C2-C5 pendant groups is selected from the group consisting of C4-C7 dienes, C6-C7 trienes, and mixtures thereof.

Aspect 11; The heat curable liquid rubber composition according to any of Aspects 1-10, wherein the at least one monomer that results in the C6-C13 pendant groups is selected from the group consisting of C8-C15 dienes, C8-C15 trienes, C8-C15 tetraenes, vinyl aromatic monomers comprising between 8 and 15 carbon atoms, and mixtures thereof.

Aspect 12: The heat curable liquid rubber composition according to any of Aspects 1-11, wherein the at least one monomer that results in the C2-C5 pendant groups is selected from the group consisting of butadiene; isoprene; 2,3-dimethyl butadiene; 1,3-pentadiene; 2-methyl-1,3-pentadiene; 1,3-hexadiene; 1,3-cyclohexadiene; and mixtures thereof; and the at least one monomer that results in the C6-C13 pendant groups is selected from the group consisting of 1,3-octadiene; 2-methyl-1,3-octadiene; 1,3,7-octatriene; myrcene; styrene; alpha-methyl styrene; 2-methylstyrene; 3-methylstyrene; 4-methylstyrene; 4-propyl styrene; 4-t-butylstyrene; 4-cyclohexyl styrene; 2,4-dimethylstyrene; 2,4-diisopropyl styrene; 2,4,6-trimethyl styrene; 1-vinylnaphthalene; 2-vinyl naphthalene; N, N-diethyl-4-aminoethyl styrene; vinyl pyridine; 4-methoxystyrene; monochloro styrene; dichloro styrene; divinyl benzene, farnesene; and mixtures thereof.

Aspect 13: The heat curable liquid rubber composition according to any of Aspects 1-12, wherein the heat activated crosslinking agent comprises sulfur, and the heat curable liquid rubber composition further comprises at least one accelerator and at least one activator.

Aspect 14: The heat curable liquid rubber composition according to Aspect 13, wherein the at least one accelerator is selected from the group consisting of a sulfenamide, a thiazole, a dithiocarbamate, a thiuram-based compound, and mixtures thereof; and the at least one activator is selected from the group consisting of a metal oxide, a fatty acid metal salt, a fatty acid, and mixtures thereof.

Aspect 15: The heat curable composition according to any of Aspects 13 or 14, wherein: the at least one accelerator is selected from the group consisting of N-cyclohexyl-2-benzothiazolesulfenamide (CBS), N-tert-butyl-2-benzothiazyl sulfenamide (TBBS), and mixtures thereof; and the at least one activator is selected from the group consisting of zinc oxide, calcium oxide, magnesium oxide, zinc stearate, and mixtures thereof.

Aspect 16: The heat curable liquid rubber composition according to any of Aspects 1-12, wherein the heat activated crosslinking agent comprises an organic peroxide having a 10-hour half-life from 47° C. to 127° C.

Aspect 17: The heat curable liquid rubber composition according to Aspect 16, wherein the heat curable liquid rubber composition further comprises a metal oxide and a fatty acid and at least one coagent, wherein the at least one coagent is selected from the group consisting of metallic acrylates, metallic methacrylates, and mixtures thereof.

Aspect 18: The heat curable liquid rubber composition according to any of Aspects 1-17, wherein the liquid polyene component has a weight average molecular weight greater than 2500 g/mol.

Aspect 19: The heat curable liquid rubber composition according to any of Aspects 1-18, comprising between 10 and 80 weight percent of the liquid polyene component.

Aspect 20: The heat curable liquid rubber composition according to any of Aspects 1-19, comprising between 15 and 55 weight percent of the liquid polyene component.

Aspect 21: The heat curable liquid rubber composition according to any of Aspects 1-20, further comprising at least one filler.

Aspect 22: The heat curable liquid rubber composition according to Aspect 21, wherein the at least one filler is selected from the group consisting of calcium carbonate, silicas, carbon black, clays, talc, mica, calcium oxide, aluminas, magnesium carbonate, and mixtures thereof.

Aspect 23: The heat curable liquid rubber composition according to any of Aspects 1-22, comprising between 15 and 70 weight percent of the at least one filler.

Aspect 24: The heat curable liquid rubber composition according to any of Aspects 21-23, comprising between 25 and 60 weight percent of the at least one filler.

Aspect 25: The heat curable liquid rubber composition according to any of Aspects 1-24, wherein the composition is curable between 100° C. and 190° C.

Aspect 26: An adhesive composition comprising the heat curable liquid rubber composition according to any of Aspects 1-25, at least one filler, and at least one adhesion promotor.

Aspect 27: A sealant composition comprising the heat curable liquid rubber composition according to any of Aspects 1-25, and at least one filler.

Aspect 28: A vibration damping composition comprising the heat curable liquid rubber composition according to any of Aspects 1-25, wherein the loss factor (tan δ) is greater than 0.53 when measured at 50 Hz frequency, 3 μm amplitude, and temperatures of −10° C. to +35° C.

Aspect 29: A cured rubber composition which is a cured reaction product of a heat curable liquid rubber composition according to any of Aspects 1-28, wherein, after curing at a temperature between 100° C. and 240° C. for between 5 minutes and 10 hours, the heat curable liquid rubber composition yields a cured rubber composition comprising:

i) a loss factor (tan δ) greater than 0.51 when measured at 50 Hz frequency, 3 μm amplitude, and temperatures of −10° C. to 45° C.;

ii) a maximum loss factor temperature greater than −10° C.; and iii) a swelling ratio from 40% to 170% by weight, as measured by equilibrium weight gain in toluene at 25° C.

Within this specification, embodiments have been described in a way which enables a clear and concise specification to be written, but it is intended and will be appreciated that embodiments may be variously combined or separated without departing from the invention. For example, it will be appreciated that all preferred features described herein are applicable to all aspects of the invention described herein.

In some embodiments, the invention herein can be construed as excluding any element or process step that does not materially affect the basic and novel characteristics of the curable liquid rubber composition, process using the curable liquid rubber composition, or article made using the curable liquid rubber composition. Additionally, in some embodiments, the invention can be construed as excluding any element or process step not specified herein.

Although the invention is illustrated and described herein with reference to specific embodiments, the invention is not intended to be limited to the details shown. Rather, various modifications may be made in the details within the scope and range of equivalents of the claims and without departing from the invention.

EXAMPLES

The following non-limiting examples are provided for the purpose of elucidating the advantages obtained from aspects of the present invention.

TABLE 1

Characteristics of liquid rubber resins used in the formulations:

| LIQUID POLYENES | Composition in molar percent | | | Vinyl content of butadiene (%) | Pendant groups content (mol %) | Mw (g/mol) | Viscosity (mPa · s) at 25° C. |
|---|---|---|---|---|---|---|---|
| | Butadiene (%) | Styrene (%) | Farnesene (%) | | | | |
| LPB 1 | 100 | | | 15 | 15 | 4800 | 1500 |
| LPB 2 | 100 | | | 28 | 28 | 9500 | 15000 |
| LPB 3 | 100 | | | 58 | 58 | 1700 | 1500 |
| LPB 4 | 100 | | | 80 | 80 | 3400 | 115000 |
| LPB 5 | 100 | | | 60 | 60 | 3150 | 4000 |
| HTPB * | 100 | | | 65 | 65 | 3600 | 13000 |
| SB Copolymer 1 | 72 | 28 | | 30 | 49 | 3850 | 17500 |
| SB Copolymer 2 | 75 | 25 | | 70 | 77 | 5450 | 610000 |
| PFD 1 * | | | 100 | | 100 | 3600 | 1700 |
| PFD 2 * | | | 100 | | 100 | 25000 | 11000 |
| BU-FENE Copolymer 1 | 93 | | 7 | 51 | 54 | 2700 | 2800 |
| BU-FENE Copolymer 2 | 85 | | 15 | 48 | 55 | 2400 | 1900 |

* Liquid polyenes terminated with hydroxyl functions

Method to Define Microstructure of Liquid Rubber Resins and Definition of Pendant Groups 1H Nuclear Magnetic Resonance (NMR) methods were used to determine the microstructure of liquid rubber resins (in particularly those listed in the table below), using a Bruker Avance III 400 MHz spectrometer with CDCl3 as a solvent. The analytical protocol is defined in: *Iranian Polymer Journal* 12 (6), 2003, p 515-521 and in *Polymer Engineering and Science*, 2007, p 87-94; as well as Proceedings of the conference presented at the Fall 190th Technical Meeting of Rubber Division, ACS Cleveland, Ohio, Oct. 11-13, 2016.

Pendant Group Content:

In Table 1 above, a new criterion, called pendant group content, is defined to characterize the liquid polyene component. It corresponds to the molar amount of pendant groups present in the microstructure of the liquid rubber polyene component and is calculated by adding three values:

percent vinyl of the molar percent butadiene comonomer in the polyene component molar percent styrene comonomer in the polyene component molar percent farnesene comonomer in the polyene component Since the butadiene component can have varying amounts of groups, the total molar amount of pendant groups along the polyene backbone(s) contributed by the butadiene comonomer is the percent vinyl times the molar percent butadiene in the liquid polyene.

Example Calculation of Molar Percent Pendant Groups in Polyene Component:

As detailed in Table 1, the composition "SB copolymer 1" contains 72 molar percent butadiene comonomer, of which 30 percent are present as vinyl pendant groups. "SB copolymer 1" also has 28 molar percent of styrene comonomer, of which 100 percent are present as pendant groups. Therefore, the total molar percent of pendant groups in "SB copolymer 1" is calculated as:

(0.30×72)=21 molar percent pendant groups from butadiene PLUS (1.0×28)=28 molar percent pendant groups from styrene 21%+28%=49 molar percent pendant groups in SB copolymer 1

For avoidance of doubt, if one considers 100 monomer units in the polyene component, then according to the above description, 21 of the monomer units will have a vinyl pendant group and 28 of the monomer units will have a phenyl pendant group, and therefore a total of 49 of the 100 monomer units will have a pendant group.

For a polyene component that contains a blend of two or more polyenes, the molar percent of pendant groups is based on the blend as a whole. For instance, referring to the Examples below, Comparative Examples 1 and 2 (Tables 1 and 2 below) comprise a polyene component that is 70 weight percent of "LPB 1" and 30 weight percent of "LPB 2". Referring to Table 1 above, LPB 1 has Mw=4800 g/mol and has 15 molar % pendant group content. LBP 2 has Mw=9500 g/mol and 28 molar % pendant groups. Therefore, one can calculate that this polyene component comprises 82 molar percent LPB 1 and 18 molar percent LPB 2. Thus, the polyene component as a whole has (0.82×15)+(0.18×28)=17.3 molar percent pendant group content.

For avoidance of doubt, if one considers 100 monomer units in the polyene component, then according to the above description, 17.28 of the monomer units in the blend that comprises the polyene component will have a vinyl pendant group.

Method to Measure Weight Average Molecular Weight of Liquid Rubber Resins:

Standard size exclusion chromatography (SEC) is utilized to determine average molecular weight of the liquid rubber samples on an Agilent 1260 Infinity II setup with degasser, isocratic pump and RID (refractive index) detector. SEC analyses are carried out in THF (tetrahydrofuran) using: one Styragel HR4E column and refractive index detection.

For the SEC analyses, 15 mg of liquid rubber samples were dissolved in 15 ml of THF (purity: ≥99.5%—stabilized Normapur or equivalent) solution containing one drop of toluene (internal standard). The conditions of SEC analyses were the following: 20 µl for injection volume; 1.0 ml/min for flow rate and 35° C. for temperature.

Weight average molecular weight (Mw) values for low molecular weight butadiene-based homopolymers and butadiene-(β-)farnesene copolymers were determined by calibration using an in-house poly(butadiene) calibration. The Mw values for low molecular butadiene-styrene copolymers and poly(trans-β-farnesene) were calculated using poly(styrene) calibration standards.

Viscosity of Liquid Rubber Resins:

Viscosity values of liquid rubber resins were measured at 25° C. on a Brookfield DV-II viscometer using "S" serial spindle. To perform the measurements at a stabilized temperature, the chamber of Brookfield viscometer was linked to a LAUDA L100 bath with a temperature set point of 25° C.

Preparation of Heat Curable Liquid Rubber-Based Compositions and Measurement of Properties of the Cured Compositions:

The liquid rubber-based composition were prepared with a Speed Mixer (capable of mixing the components at least 3000 rpm) at room temperature. The exemplary protocol was the following:

Step 1: add the liquid rubber(s), crosslinking agents, metal oxide, antioxidants and other chemicals comprising in the formulation; then mix them at 3000 rpm for 60 seconds;

Step 2: add half of the filler amount to the composition; then mix it at 3000 rpm for 60 seconds;

Step 3: add the rest of fillers amount in the composition; then mix it at 3000 rpm for 60 seconds;

Step 4: carry out a visual control of formulation (to check the homogeneity of formulation) before launching the last mixing step at 3000 rpm during 180 seconds.

After the mixing step, all the compositions were cured in the temperature range from 100° C. to 190° C. The curing step was performed in a mold to obtain a sheet having the following size: 75 mm×75 mm×3.7 mm.

Swelling Test:

From the cured sheet, two specimens having the following dimension: 25 mm×7 mm×3.7 mm were cut and weighed (initial weight–approximatively 0.7 g to 1.0 g). Each sample was completely immersed in pure toluene, in a sealed glass bottle, at room temperature (25° C.) until equilibrium swelling occurred. The swelling test takes about 24 hours. When this step was completed, the swelled samples were removed from the bottles. The excess toluene from the surface of each sample was wiped off and the weight of the swollen sample (swelling weight) is immediately measured.

From the initial weight of samples and their weight at the end of swelling test, the swelling ratio (Swelling Ratio) can be calculated:

Swelling Ratio (%)=100×[(Swelled Weight–Initial Weight)/Initial Weight]

Shore A hardness:

A Shore A hardness device was used to measure the hardness of the cured sheet of each composition. The sheet thickness was 3.7 mm at room temperature (23° C.±2° C.). The Shore A hardness was recorded after a measuring period of at least 20 seconds. The Shore A hardness was measured according to ASTM D2240-15.

Maximum Loss Factor and Maximum Loss Factor Temperature:

For determining the maximum loss factor and the temperature of maximum loss factor, the compositions were tested in a Q800 DMA (Dynamic Mechanical Analyzer)

apparatus (from TA Instruments) operated with the Shear Sandwich clamp. Specimens having a size 10 mm×10 mm×3.7 mm were cut from the cured sheet of each composition and were analyzed with the DMA equipment according to the following conditions:
- amplitude: 3 μm
- frequency: 50 Hz
- temperature range: from −80° C. to +80° C.

Maximum loss factor at 50 Hz corresponds to the maximum tan δ value observed on the tan δ curve of the composition, registered during its DMA analysis.

Formulations Cured with Sulfur-Based Systems:

As discussed above, the heat curable liquid rubber composition formulations based on the liquid polyenes have the pendant groups are crosslinked, in general, with systems containing sulfur and accelerators. Some compositions based on the low vinyl polybutadienes (as main liquid rubber resins) were prepared (see Comparative 1 and Comparative 2 compositions in Table 2). Their damping performances are considered as being "references". Their maximum loss factors are temperatures less than −8° C. All the amounts of components are indicated in part by one hundred of liquid rubbers (phr) in the tables below.

TABLE 2

Compositions cured with sulfur-based crosslinking agent

| Components (Table 1 for liquid polyenes) | Comparative 1 | Comparative 2 | Example 1 | Example 2 | Example 3 |
|---|---|---|---|---|---|
| LPB 1 | 70.0 | 70.0 | | | |
| LPB 2 | 30.0 | 30.0 | | | |
| HTPB | | | 100.0 | | |
| LPB 5 | | | | 100.0 | |
| PFD 1 | | | | | 100.0 |
| OMYALITE ® 90 OM + | 58.5 | 58.5 | 58.5 | 58.5 | 58.5 |
| Sulfur | 19.9 | 9.5 | 18.5 | 16.2 | 15.2 |
| Sulphenamide-based Accelerator ++ | 15.3 | 7.0 | 18.5 | 6.5 | 15.2 |
| Thiuram-based accelerator +++ | 4.6 | 2.5 | | 9.7 | |
| Zinc oxide ++++ | 7.7 | 7.7 | 7.7 | 7.7 | 7.7 |
| Zinc Stearate +++++ | 7.7 | 7.7 | 7.7 | 7.7 | 7.7 |
| Total | 213.7 | 192.9 | 210.9 | 206.3 | 204.3 |
| Swelling ratio (%) | +65% | +103% | +93% | +90% | +66% |
| Shore A hardness | 76 | 66 | 70 | 70 | 73 |
| Max. loss factor (50 Hz) | 0.464 | 0.630 | 0.785 | 0.683 | 0.680 |
| Max loss factor Temperature | −9° C. | −32° C. | +36° C. | +32° C. | +2° C. |

+ OMYALITE ® 90 OM: powdered calcium carbonate manufactured by OMYA
++ The most preferred primary accelerators incorporated in the formulations are sulphenamides, as CBS or TBBS. Some other primary accelerators, as thiazole (MBT or MBTS) or dithiocarbamates (ZDMC or ZBEC), can be used in a blend with sulphenamides or instead of sulphenamides.
+++ The most preferred ultra-accelerators are thiurams, as TMTD or TBzTD. Dithiocarbamates or xanthates can be also employed.
++++ Zinc Oxide—AnalaR NORMApur from VWR Chemicals/Other metal oxidses, as calcium oxide or magnesium oxide, can be incorporated in liquid rubber-based formulations.
+++++ Zinc Stearate from Acros Organics -/Other metallic stearates can be also introduced in the formulations or can be replaced by fatty acids, as stearic acid.

By substituting low vinyl content polybutadienes with butadiene-based homopolymers or farnesene homopolymers with a pendant group content higher than 45% and Mw greater than or equal to 2000 g/mol, the maximum loss factor value of compositions increases by approximately 7.5% at similar or lower swelling ratio than the "comparative" compositions. Moreover, the three formulations having as reference "Example" in Table 2 above possess maximum loss factors in the temperature range from −10° C. to +45° C.

TABLE 3

Compositions cured with sulfur-based crosslinking agent

| Components (Table 1 for liquid polyenes) | Comparative 1 | Comparative 2 | Example 4 | Example 5 | Example 6 |
|---|---|---|---|---|---|
| LPB 1 | 70.0 | 70.0 | | | |
| LPB 2 | 30.0 | 30.0 | | | |
| SB Copolymer 1 | | | 100.0 | | |
| BU-FENE Copolymer 1 | | | | 100.0 | |
| BU-FENE Copolymer 2 | | | | | 100.0 |
| OMYALITE ® 90 OM + | 58.5 | 58.5 | 58.5 | 58.5 | 58.5 |
| Sulfur | 19.9 | 9.5 | 16.4 | 16.1 | 17.4 |
| Sulphenamide-based Accelerator ++ | 15.3 | 7.0 | 16.4 | 8.1 | 9.0 |

TABLE 3-continued

Compositions cured with sulfur-based crosslinking agent

| Components (Table 1 for liquid polyenes) | Comparative 1 | Comparative 2 | Example 4 | Example 5 | Example 6 |
|---|---|---|---|---|---|
| Thiuram-based accelerator +++ | 4.6 | 2.5 | | 8.0 | 8.4 |
| Zinc oxide ++++ | 7.7 | 7.7 | 7.7 | 7.7 | 7.7 |
| Zinc Stearate +++++ | 7.7 | 7.7 | 7.7 | 7.7 | 7.7 |
| Total | 213.7 | 192.9 | 206.7 | 206.1 | 208.7 |
| Swelling ratio (%) | +65% | +103% | +95% | +100% | +91% |
| Shore A hardness | 76 | 66 | 70 | 69 | 69 |
| Max. loss factor (50 Hz) | 0.464 | 0.630 | 0.685 | 0.751 | 0.764 |
| Max loss factor Temperature | −9° C. | −32° C. | +19° C. | +30° C. | +40° C. |

+ OMYALITE ® 90 OM: powdered calcium carbonate manufactured by OMYA
++ The most preferred primary accelerators incorporated in the formulations are sulphenamides, as CBS or TBBS. Some other primary accelerators, as thiazole (MBT or MBTS) or dithiocarbamates (ZDMC or ZBEC), can be used in blend with sulphenamides or instead of sulphenamides.
+++ The most preferred ultra-accelerators are thiurams, as TMTD or TBzTD. Dithiocarbamates or xanthates can be also employed.
++++ Zinc Oxide—AnalaR NORMApur from VWR Chemicals/Other metal oxides, as calcium oxide or magnesium oxide, can be incorporated in liquid rubber-based formulations.
+++++ Zinc Stearate from Acros Organics -/Other metallic stearates can be also introduced in the formulations or can be replaced by fatty acids, as stearic acid.

Incorporation of butadiene-based copolymers, with a molecular weight greater than or equal to 2000 g/mol and a pendant group content greater than 45%, into a formulation cured with sulfur systems (instead of liquid polybutadienes not meeting these criteria) results in improvement of the damping performance of liquid polyene-based compositions by at least 8% in the temperature range from −10° C. to +45° C.

It appears also that the viscosity of liquid rubber-based compositions should be significantly reduced due to the incorporation of farnesene-based homopolymers or/and butadiene-farnesene copolymers. (See Table 1 above.)

Formulations Cured with Organic Peroxides

Some peroxide-cured formulations were prepared to establish if the liquid polyene component having a pendant group content greater than 45% and a Mw greater than 2000 g/mol can improve the damping performances of formulations comprising liquid rubber(s). All the amounts of components are indicated in part by one hundred of liquid polyene (phr) in the tables below.

TABLE 4

Compositions cured with peroxide-based crosslinking agent

| Components (Table 1 for liquid polyenes) | Comparative 3 | Comparative 4 | Comparative 5 | Example 7 | Example 8 | Example 9 |
|---|---|---|---|---|---|---|
| LPB 1 | | | 100.0 | | | |
| LPB 3 | 100.0 | 100.0 | | | | |
| LPB 5 | | | | 100.0 | | |
| LPB 4 | | | | | 100.0 | |
| HTPB | | | | | | 100.0 |
| OMYALITE ® 90 OM + | 58.8 | 58.8 | 58.8 | 58.8 | 58.8 | 58.8 |
| Organic Peroxide ++ | 13.4 | 12.7 | 15.9 | 12.0 | 4.4 | 5.7 |
| Zinc oxide +++ | 5.7 | 5.7 | 5.7 | 5.7 | 5.7 | 5.7 |
| Stearic Acid ++++ | 0.9 | 0.9 | 0.9 | 0.9 | 0.9 | 0.9 |
| Total | 178.8 | 178.1 | 181.3 | 177.4 | 169.8 | 171.3 |
| Swelling ratio | 66% | 74% | 82% | 66% | 83% | 80% |
| Shore A hardness | 70 | 68 | 75 | 70 | 74 | 71 |
| Max. loss factor (50 Hz) | 0.490 | 0.495 | 0.480 | 0.554 | 0.598 | 0.555 |
| Max loss factor Temperature | +13° C. | +6° C. | −38° C. | +5° C. | +34° C. | +24° C. |

+ OMYALITE ® 90 OM: powdered calcium carbonate manufactured by OMYA
++ The organic peroxides, alternatively introduced in the compositions, are characterized by a 10-hour half life temperature from 47° C. to 127° C. (according to PERGAN brochure). The organic peroxides should be selected according to the curing temperature of the composition (from 100° C. to 190° C.). A blend of organic peroxides Is recommended to optimize the crosslinking of liquid rubber resins.
+++ Zinc Oxide—AnalaR NORMApur from VWR Chemicals/Other metal oxides, as calcium oxide or magnesium oxide, can be incorporated in liquid rubber-based formulations.
++++ Stearic Acid (grade: for synthesis)—from Merck KGaA/Other fatty acids can be also introduced in the formulations.

Incorporating liquid polybutadienes having a Mw>2500 g/mol and a vinyl content higher than 45% enables an increase in the maximum loss factor value of compositions by about 10% in the temperature range from −10° C. to +40° C. at lower or similar swelling ratio compared to the "Comparative" compositions.

TABLE 5

Compositions cured with peroxide-based crosslinking agent

| Components (Table 1 for liquid polyenes) | Comparative 4 | Comparative 5 | Example 10 | Example 11 | Example 12 | Example 13 |
|---|---|---|---|---|---|---|
| LPB 1 | | 100.0 | | | | |
| LPB 3 | 100.0 | | | | | |
| SB Copolymer 1 | | | 100.0 | | | |
| SB Copolymer 2 | | | | 100.0 | | |
| BU-FENE Copolymer 2 | | | | | 100.0 | |
| PFD 1 | | | | | | 60 |
| PFD 2 | | | | | | 40 |
| OMYALITE ® 90 OM + | 58.8 | 58.8 | 58.8 | 58.8 | 58.8 | 58.8 |
| Organic Peroxide ++ | 12.7 | 15.9 | 13.4 | 7.7 | 14.7 | 16.7 |
| Zinc oxide +++ | 5.7 | 5.7 | 5.7 | 5.7 | 5.7 | 5.7 |
| Stearic Acid ++++ | 0.9 | 0.9 | 0.9 | 0.9 | 0.9 | 0.9 |
| Total | 178.1 | 181.3 | 178.8 | 173.1 | 180.1 | 182.1 |
| Swelling ratio | +74% | +82% | +84% | +68% | +74% | +65% |
| Shore A hardness | 68 | 75 | 75 | 76 | 70 | 73 |
| Max. loss factor (50 Hz) | 0.495 | 0.480 | 0.609 | 0.603 | 0.624 | 0.586 |
| Max loss factor Temperature | +6° C. | −38° C. | −8° C. | +44° C. | −1° C. | −5° C. |

+ OMYALITE ® 90 OM: powdered calcium carbonate manufactured by OMYA
++ The organic peroxides, alternatively introduced in the compositions, are characterized by a 10-hour half life temperature from 47° C. to 127° C. (according to PERGAN brochure). The organic peroxides should be selected according to the curing temperature of the composition (from 100° C. to 190° C.). A blend of organic peroxides is recommended to optimize the crosslinking of liquid rubber resins.
+++ Zinc Oxide—AnalaR NORMApur from VWR Chemicals. Other metal oxides, as calcium oxide or magnesium oxide, can be incorporated in liquid rubber-based formulations.
++++ Stearic Acid (grade: for synthesis)—from Merck KGaA. Other fatty acids can be also introduced in the formulations.

It is observed that the substitution of low Mw butadiene homopolymers with butadiene-styrene or butadiene-farnesene copolymers, with a pendant group content of more than 45 molar % and a Mw greater than 2000 g/mol, increases the maximum loss factor (tan δ) values of the compositions by at least 20% at similar crosslinking density compared to the reference formulations over a wide temperature range.

The polyfarnesene diols can be crosslinked by organic peroxides. The compositions based on the polyfarnesene diols are characterized by a higher maximum loss factor value (about 15% higher) than the Comparative compositions specified in Table 5 above.

What is claimed:

1. A heat curable liquid rubber composition comprising:
   a. a liquid polyene component, wherein the liquid polyene component is a liquid polyene comprising a polyene backbone or a blend of liquid polyenes each comprising a polyene backbone, wherein the liquid polyene component comprises on a total molar basis, as polymerized units,
      i. at least one monomer that results in at least 45 molar percent of C2-C13 pendant groups along the polyene backbone; or
      ii. at least one monomer that results in at least 20 molar percent of C2-C5 pendant groups along the backbone of the polyene, and at least one monomer that results in at least 7 molar percent of C6-C13 pendant groups along the backbone of the polyene;
   b. between 0% and 1% by weight in total of a solid rubber or a solid thermoplastic; and
   c. at least one heat activated crosslinking agent; and
   wherein, after curing, the heat curable liquid rubber composition yields a cured rubber composition comprising:
      i) a loss factor (tan δ) greater than 0.51 when measured at 50 Hz frequency, 3 μm amplitude, and temperatures of −10° C. to 45° C.;
      ii) a maximum loss factor temperature greater than −10° C.; and
      iii) a swelling ratio from 40% to 170% by weight, as measured by equilibrium weight gain in toluene at 25° C.

2. The heat curable liquid rubber composition according to claim 1, wherein the liquid polyene component has a weight average molecular weight greater than 2000 g/mol and a Brookfield S spindle viscosity of 500-700,000 mPa·sec at 25° C.

3. The heat curable liquid rubber polyene composition according to claim 1, wherein the liquid polyene or at least one liquid polyene in the blend of liquid polyenes is terminated with hydroxyl groups or functional derivatives thereof.

4. The heat curable liquid rubber composition according to claim 1, wherein after curing the cured rubber composition has a Shore A hardness greater than 55 as measured by ASTM Standard D2240-15.

5. The heat curable liquid rubber composition according to claim 1, wherein the at least one monomer that results in the C2-C13 pendant group is selected from the group consisting of C4 to C15 dienes, C6 to C15 trienes, C8-C15 tetraenes, vinyl aromatic compounds comprising 15 or fewer carbon atoms, and mixtures thereof.

6. The heat curable liquid rubber composition according to claim 5, wherein the at least one monomer that results in the C2-C13 pendant group comprises at least one vinyl aromatic compound selected from the group consisting of styrene; alpha-methyl styrene; 2-methylstyrene; 3-methylstyrene; 4-methylstyrene; 4-propyl styrene; 4-t-butylstyrene; 4-cyclohexyl styrene; 2,4-dimethylstyrene; 2,4-diisopropyl styrene; 2,4,6-trimethyl styrene; 1-vinylnaphthalene; 2-vinyl naphthalene; N, N-diethyl-4-aminoethyl styrene; vinyl pyridine; 4-methoxystyrene; monochloro styrene; dichloro styrene; divinyl benzene; and mixtures thereof.

7. The heat curable liquid rubber composition according to claim 5, wherein the at least one monomer that results in the C2-C13 pendant group comprises at least one of: a) a C4 to C14 diene selected from the group consisting of butadiene, isoprene, 2,3-dimethyl butadiene, 2-phenyl butadiene, 1,3-pentadiene, 2-methyl-1,3-pentadiene, 1,3-hexadiene, 1,3-octadiene, 1,3-cyclohexadiene, 2-methyl-1,3-octadiene, and mixtures thereof; b) a C6 to C15 triene selected from the group consisting of 1,3,7-octatriene, myrcene, and mixtures thereof; or c) farnesene.

8. The heat curable liquid rubber composition according to claim 1, wherein the at least one monomer that results in the C2-C13 pendant groups is selected from the group consisting of butadiene, isoprene, alpha-methyl styrene, styrene, myrcene, farnesene, and mixtures thereof.

9. The heat curable liquid rubber composition according to claim 1, wherein the at least one monomer that results in the C2-C5 pendant groups is selected from the group consisting of C4-C7 dienes, C6-C7 trienes, and mixtures thereof.

10. The heat curable liquid rubber composition according to claim 1, wherein the at least one monomer that results in the C6-C13 pendant groups is selected from the group consisting of C8-C15 dienes, C8-C15 trienes, C8-C15 tetraenes, vinyl aromatic monomers comprising between 8 and 15 carbon atoms, and mixtures thereof.

11. The heat curable liquid rubber composition according to claim 1, wherein the at least one monomer that results in the C2-C5 pendant groups is selected from the group consisting of butadiene; isoprene; 2,3-dimethyl butadiene; 1,3-pentadiene; 2-methyl-1,3-pentadiene; 1,3-hexadiene; 1,3-cyclohexadiene; and mixtures thereof; and the at least one monomer that results in the C6-C13 pendant groups is selected from the group consisting of 1,3-octadiene; 2-methyl-1,3-octadiene; 1,3,7-octatriene; myrcene; styrene; alpha-methyl styrene; 2-methylstyrene; 3-methylstyrene; 4-methylstyrene; 4-propyl styrene; 4-t-butylstyrene; 4-cyclohexyl styrene; 2,4-dimethylstyrene; 2,4-diisopropyl styrene; 2,4,6-trimethyl styrene; 1-vinylnaphthalene; 2-vinyl naphthalene; N, N-diethyl-4-aminoethyl styrene; vinyl pyridine; 4-methoxystyrene; monochloro styrene; dichloro styrene; divinyl benzene, farnesene; and mixtures thereof.

12. The heat curable liquid rubber composition according to claim 1, wherein the heat activated crosslinking agent comprises sulfur, and the heat curable liquid rubber composition further comprises at least one accelerator and at least one activator.

13. The heat curable liquid rubber composition according to claim 12, wherein the at least one accelerator is selected from the group consisting of a sulfenamide, a thiazole, a dithiocarbamate, a thiuram-based compound, and mixtures thereof; and the at least one activator is selected from the group consisting of a metal oxide, a fatty acid metal salt, a fatty acid, and mixtures thereof.

14. The heat curable composition according to claim 13, wherein: the at least one accelerator is selected from the group consisting of N-cyclohexyl-2-benzothiazolesulfenamide (CBS), N-tert-butyl-2-benzothiazyl sulfenamide (TBBS), and mixtures thereof; and the at least one activator is selected from the group consisting of zinc oxide, calcium oxide, magnesium oxide, zinc stearate, and mixtures thereof.

15. The heat curable liquid rubber composition according to claim 1, wherein the heat activated crosslinking agent comprises an organic peroxide having a 10-hour half-life from 47° C. to 127° C.

16. The heat curable liquid rubber composition according to claim 15, wherein the heat curable liquid rubber composition further comprises a metal oxide and a fatty acid and at least one coagent, wherein the at least one coagent is selected from the group consisting of metallic acrylates, metallic methacrylates, and mixtures thereof.

17. The heat curable liquid rubber composition according to claim 1, wherein the liquid polyene component has a weight average molecular weight greater than 2500 g/mol.

18. The heat curable liquid rubber composition according to claim 1, comprising between 10 and 80 weight percent of the liquid polyene component.

19. The heat curable liquid rubber composition according to claim 1, comprising between 15 and 55 weight percent of the liquid polyene component.

20. The heat curable liquid rubber composition according to claim 1, further comprising at least one filler.

21. The heat curable liquid rubber composition according to claim 20, wherein the at least one filler is selected from the group consisting of calcium carbonate, silicas, carbon black, clays, talc, mica, calcium oxide, aluminas, magnesium carbonate, and mixtures thereof.

22. The heat curable liquid rubber composition according to claim 20, comprising between 15 and 70 weight percent of the at least one filler.

23. The heat curable liquid rubber composition according to claim 20, comprising between 25 and 60 weight percent of the at least one filler.

24. The heat curable liquid rubber composition according to claim 1, wherein the composition is curable between 100° C. and 190° C.

25. An adhesive composition comprising the heat curable liquid rubber composition according to claim 1, at least one filler, and at least one adhesion promotor.

26. A sealant composition comprising the heat curable liquid rubber composition according to claim 1, and at least one filler.

27. A vibration damping composition comprising the heat curable liquid rubber composition according to claim 1, wherein the loss factor (tan δ) is greater than 0.53 when measured at 50 Hz frequency, 3 μm amplitude, and temperatures of −10° C. to +35° C.

* * * * *